United States Patent [19]

Corbett

[11] Patent Number: 4,957,017
[45] Date of Patent: Sep. 18, 1990

[54] ASSEMBLY AND METHOD FOR THE ADJUSTMENT OF A CABLE CASING

[75] Inventor: Christopher H. Corbett, Bolivar, Ohio

[73] Assignee: Flex Technologies, Inc., Midvale, Ohio

[21] Appl. No.: 336,738

[22] Filed: Apr. 12, 1989

[51] Int. Cl.$^5$ .............................................. F16C 1/10
[52] U.S. Cl. .................................. 74/502.4; 74/502.6; 74/500.5
[58] Field of Search .......... 74/501.5 R, 500.5, 501.54, 74/501.6, 502.4, 502.6; 192/111 A, 70.25, 30 W; 188/196 P, 196 B, 196 V

[56] References Cited

U.S. PATENT DOCUMENTS

| | | | |
|---|---|---|---|
| 2,424,863 | 7/1947 | Swain | 74/502.6 |
| 4,066,147 | 1/1978 | Toyomoto | 74/502.6 |
| 4,534,239 | 8/1985 | Heimann | 74/502.4 |
| 4,742,901 | 5/1988 | Takeuchi et al. | 132/70.25 |
| 4,787,263 | 11/1988 | Jaksic | 74/501.5 R |
| 4,798,098 | 1/1989 | Keller et al. | 74/502.6 |
| 4,798,100 | 1/1983 | Baumgarten | 74/502.4 |
| 4,833,937 | 5/1989 | Nagano | 74/502.4 |

FOREIGN PATENT DOCUMENTS 1461806 11/1966 France .................................. 403/105

OTHER PUBLICATIONS

Parket Brass Products Div., Otsego, Michigan 49078, Catalog 3501-E, John Guest USA, Inc. Marketing and Drawing No, S251. (P/COL/U.S.A. 1/7/1985).
Voeker Controls Company, 3077 Nationwide Parkway, Brunswick, Ohio 44212-2394.
Pages 1, 3 & 5 of the Innovative Fluid Connectors and Valve Brochure.

Primary Examiner—Vinh T. Ludng
Attorney, Agent, or Firm—Michael Sand Co.

[57] ABSTRACT

An improved assembly and method for the adjustment of a casing of the type having a cable slideably mounted therein to remove excess slack from the casing. The cable and casing circuitously extend between a lever of a vehicle temperature control module and a temperature control door movably mounted on a forward bulkhead of the vehicle. A first mounting member is attached adjacent to the control module lever and contains a first tang ring for slideably receiving a movable end of the casing. A second mounting member immovably mounts the other end of the casing adjacent to the bulkhead door. The first tang ring permits movement of the movable end of the casing therethrough in a first direction for removing slack from the casing, upon a predetermined amount of force being exerted on the casing by manual adjustment of the control module lever in a predetermined direction. The first tang ring maintains the casing in an adjusted position by restraining movement thereof in a second direction opposite to the first direction. A movable locking member contains a second tang ring and is slideably mounted on the casing adjacent to and spaced from the first mounting member. After movement of the casing in the first direction to its adjusted position, the locking member is manually moved into abutment with the first mounting member so that the casing subsequently is restrained from additional movement in the first direction by the tang ring of the locking member.

10 Claims, 4 Drawing Sheets

ASSEMBLY AND METHOD FOR THE ADJUSTMENT OF A CABLE CASING

CROSS REFERENCE TO RELATED APPLICATION

The invention described and shown herein is a modification of the invention described and shown in and entitled Assembly For The Self-Adjustment Of A Cable Casing now U.S. Pat. No. 4,892,003 issued on Jan. 9, 1930.

BACKGROUND OF THE INVENTION

1. Technical Field

The invention relates to assemblies for eliminating excess slack in cable casings and in particular to an assembly which adjusts the casing of a cable which extends between and operatively connects a pair of movable members. More particularly, the invention relates to a locking device for such assemblies which prevents overadjustment of the casing of a cable which circuitously extends between and operatively connects a temperature control module lever and a bulkhead door in a vehicle.

2. Background Information

All types of vehicles having enclosed passenger compartments, including automobiles, trucks, vans and mini-vans, continue to grow in popularity with the number of these vehicles predicted to increase in the future. Vehicle manufacturers, recognizing this ever-growing market, are continually striving to improve their products. These improvements include on-board computers for regulating and monitoring engine performance, improved aerodynamic design for better gas mileage and aesthetic appearance, interior upholstery which rivals that found in the living rooms of many homes, and even computers which calculate and display by LEDs on the dashboard everything from gas mileage to the preferred route for a trip. Despite such advances, manufacturers have been unable to satisfactorily solve the problem of forward firewall or bulkhead doors which improperly open and close upon manual adjustment of control levers for regulating the environment in the passenger compartment.

Most vehicles have a control module mounted in the dashboard for regulating the temperature within the passenger compartment. Other functions such as venting and defrosting of the vehicle windows also are controlled by manual adjustment of the module levers. The levers are connected by cables to the bulkhead doors which are movably mounted for opening and closing apertures formed in the bulkhead.

For example, in many automobiles one of the levers of the control module is moved to the "hot" position for opening a door on the bulkhead and permitting heat to be blown into the passenger compartment during cold weather. As the lever is moved from the "cold" to "hot" position, the cable extending between the lever and door is displaced in the direction of the lever, and the door is pulled to the open position. When the lever is returned to the "cold" position, the cable is displaced in the direction of the door and the door is pushed to the closed position.

Problems occur because the cable is slideably mounted in a casing which typically follows a circuitous path between the control module and door. The casing is required for guiding the cable along its circuitous path. In most vehicles, the cable casing is mounted at its ends adjacent to the door and control module lever, and when the cable is displaced the casing ends are forced against their mounting members if any excess slack is present in the casing. This excess slack cannot be relieved because the casing ends are immovable. Thus, the cable follows the circuitous path of the casing and because of the excess slack in the casing, the cable does not achieve the proper displacement or linear travel required for opening the bulkhead door. Also, the possibility of failure of the mounting members for the casing ends is increased due to the pressure exerted on the casing ends by the compressed casing. A similar problem occurs when an attempt is made to close the door, in that adequate displacement of the cable toward the door is not achieved because the cable again follows the circuitous path of the excessively slackened casing.

Therefore, it is apparent that excess slack in the cable casing prevents proper environment control within the vehicle passenger compartment. The operator of the vehicle often is confused because the expected position of the bulkhead door is not achieved when the control module lever is adjusted. Thus, although the lever may be positioned at full "hot", which indicates that the door is completely open, the actual position of the door may indeed only be half open.

It also should be noted that the phenomenon of excess slack in a casing for a cable extending in a circuitous path between two movable members occurs in applications other than for vehicles. For example, the same problems are common in the cable casing which extends between the control lever and the throttle of a lawn mower engine.

Attempts to solve such problems are well-known in the art and include such prior art devices as a turnbuckle connected to the cable casing, the mounting of a spring clip on the door end of the cable which is operatively connected to the control lever, and the use of a Bowden wire. However, many of these prior art devices require time-consuming installation and manual adjustment.

Known prior art assemblies include quick-connect fittings of the type used with pneumatic and hydraulic pressure system tubing and the like, and instant push-in tube fittings of the type which comprise a main lightweight body, an O-ring fluid seal and a plastic collet having stainless steel teeth.

The particular cable casing adjustment assembly of Pat. No. 4,892,003 which is assigned to the same assignee as the present application, satisfactorily solves most of the above-described problems in an economical and efficient manner.

The modified assembly shown and described herein solves the above-described problems in addition to other problems which occur in certain applications. More particularly, in many applications, a cable casing must traverse an unusually long and circuitous path to operatively connect the control lever and the bulkhead door, which can cause the problems set forth below.

The component of the adjustment assembly of the above-referenced patent application which allows adjustment of the casing in a first direction and prevents movement of the casing in a second direction opposite to the first direction after adjustment, preferably is a flat ring having a plurality of circumferentially spaced, generally radially inwardly extending gripping tangs inclined in the first direction. In normal applications, where the casing path is not unusually long and circuitous, the tangs are resilient enough to allow movement of the casing through the tang ring in the first direction during adjustment, yet rigid enough to prevent unintended post-adjustment movement of the casing through the tang ring in the first direction resulting in overadjustment of the casing which can prevent proper operation of the bulkhead door. Such unintended movement can be caused by vehicle vibrations, movement of the bulkhead door past its fully open position caused by excessive air flow past the door, etc.

The rigidity of the tangs necessary to counteract such potential unintended forces requires that a certain predetermined force be exerted on the casing by manual adjustment of the control module lever in a predetermined direction, in order to move the casing past the tangs and in the first direction to the adjustment position. Where the path of a casing is unusually long and circuitous, it becomes difficult to exert enough force on the casing by manual movement of the lever to move the casing through the tang ring. Thus, the tangs must be formed of a less rigid material which, while not affecting the ability of the tangs to resist casing movement in the second direction, does allow the inadvertant forces such as vehicle vibration, to force the casing past the tangs and into an overadjusted position. The present invention solves this overadjustment problem by adding a mechanical lock to the assembly of application Pat. No. 186,570.

There is no assembly and method for the adjustment of a cable casing of which I am aware, other than my present invention, which is quickly and easily installed and adjusted on a vehicle on a production line at a vehicle assembly plant, which will provide for removal of excess slack in an unusually long and circuitous cable casing and subsequently prevent overadjustment of the casing, and which is rugged and relatively inexpensive to manufacture and install.

SUMMARY OF THE INVENTION

Objectives of the invention include providing an improved assembly and method for the adjustment of a casing of the type having a cable slideably mounted therein to remove excess slack from the casing, wherein the cable extends between and operatively connects first and second movable members.

Another objective of the invention is to provide such an improved assembly and method for the adjustment of a cable casing which provides for gradual rather than discrete amounts of slack elimination in the cable casing, and which provides for adjustment of the casing during a certain routine operation of the members to which the cable is attached.

Still another objective of the invention is to provide an improved assembly and method for the adjustment of a cable casing in which the force required for adjustment of the casing is considerably less than the gripping force applied to the casing for retaining the casing in the adjusted position and for preventing movement thereof in a direction opposite to the adjustment direction; and in which the force required for adjustment of the casing also is considerably less than the gripping force applied to the casing by a locking device of the assembly subsequent to adjustment thereof for preventing additional movement of the casing in the adjustment direction.

A still further objective of the invention is to provide an improved assembly and method for the adjustment of a cable casing in which the locking device of the assembly is quickly and easily manually manipulated subsequent to the adjustment of the casing for preventing additional movement of the casing in the adjustment direction.

Still another objective of the invention is to provide an improved assembly and method for the adjustment of a cable casing which prevents movement of the casing in the adjustment direction prior to installation of the cable casing in an application.

Another objective of the invention is to provide an improved assembly and method for the adjustment of a cable casing which is inexpensive to manufacture, rugged, and relatively easy to assemble and install.

These objectives and advantages are obtained by the improved assembly of the invention for the adjustment of a casing of the type having a cable slideably mounted therein, wherein the cable extends between and operatively connects a pair of movable members, the assembly including, first and second mounting means for attaching the casing at spaced locations generally adjacent to the movable members, the first mounting means movably mounting a first end of the casing, and the second mounting means immovably mounting a second end of the casing; gripping means mounted in the first mounting means for permitting movement of the movable first end of the casing in a first direction and for restraining movement of the casing in a second direction opposite to the first direction, so that upon movement of one of the movable members in a predetermined direction the movable first end of the casing moves in the first direction to remove slack from the casing, and is retained in an adjusted position and restrained from moving in the second direction by the gripping means; wherein the general nature of the improvement includes, lock means movably mounted on the casing adjacent to and spaced from the first mounting means for restraining post-adjustment movement of the casing in the first direction, so that upon manual movement of the lock means into abutment with the first mounting means after movement of the casing to the adjusted position, the casing subsequently is restrained from additional movement in the first direction.

The objectives and advantages further are obtained by the improved method of the invention for adjusting a casing of the type having a cable slideably mounted therein, wherein the cable extends between and operatively connects a pair of movable members, the general nature of which may be stated as including the steps of, attaching first and second mounting means for the casing at spaced locations generally adjacent to the movable members, moving one of the movable members in a predetermined direction for moving the casing in an adjustment direction for removing slack from the casing, and manually sliding a lock means into abutment with the first mounting member for restraining subsequent additional movement of the casing in the adjustment direction.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figures 1, 2:
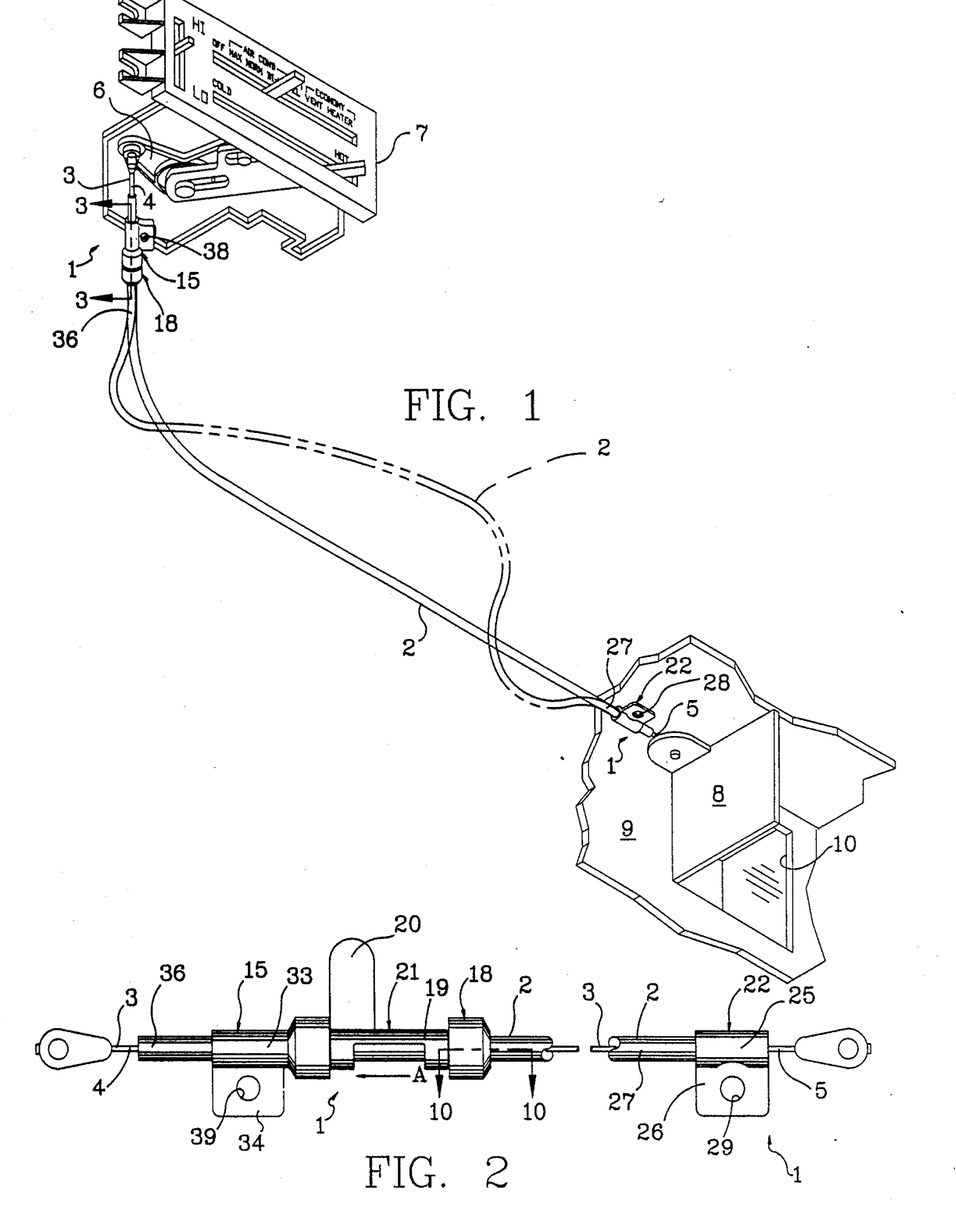
FIG. 1 is a fragmentary diagrammatic perspective view of a usual vehicle temperature control module and an associated bulkhead door operatively connected by a cable, with a slackened cable casing position being shown in dot-dash lines and an adjusted casing position being shown in full lines.
FIG. 2 is a fragmentary diagrammatic view of the cable casing ends mounted in the end mounting members of FIG. 1, and a split sleeve spacer maintaining a movable locking member in spaced relationship to one of the mounting members.

A first embodiment of the improved assembly of the invention for the adjustment of a cable casing is indicated generally at 1, and is shown in FIG. 1 in a usual operating position. A casing 2 is cylindrical-shaped and has a cable 3 slideably mounted therein (FIG. 2) which extends between and is attached by its ends 4 and 5, respectively, in a usual manner to a manually operated lever 6 of a vehicle temperature control module 7 and a door 8 which is movably mounted on a forward firewall or bulkhead 9 of a vehicle, such as an automobile, truck, etc., for operatively connecting lever 6 and door 8. Door 8 is pivotally mounted adjacent to an opening 10 formed in bulkhead 9, for opening and closing the opening upon manual adjustment of lever 6 to regulate the temperature within the passenger compartment of the vehicle.

The main components of improved assembly 1 include a module mounting member, a movable locking member, a split sleeve spacer, and a bulkhead mounting member, indicated generally at 15, 18, 21, and 22, respectively (FIG. 2).

Module mounting member 15 includes a generally cylindrical-shaped body 33 having a rectangular tab 34 formed integrally therewith (FIGS. 2 and 3), and preferably is formed of a high-strength plastic. Body 33 is formed with a generally cylindrical-shaped passageway 35 adapted for slideably receiving a first end 36 of casing 2. Passageway 35 has a generally stepped configuration at an outer end thereof to form a shoulder 37 for positioning a tang ring 16a and a retaining insert 17a therein. Mounting member 15 is attached to control module 7 adjacent to lever 6 (FIG. 1), by a usual fastener 38 which passes through an opening 39 formed in tab 34.

Figure 3:
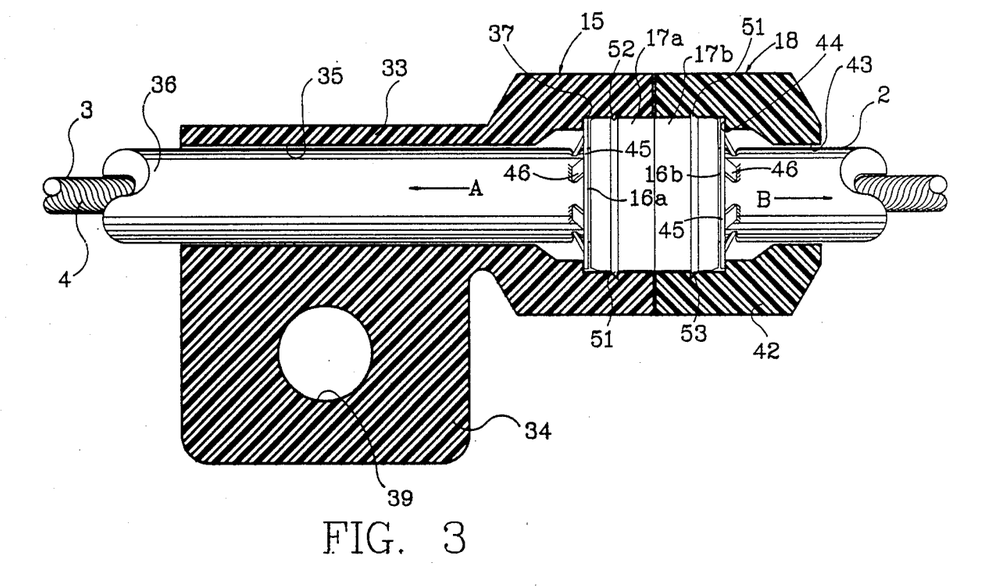
FIG. 3 is an enlarged fragmentary longitudinal sectional view of the movable locking member and the module mounting member, and showing tang rings mounted therein.
Figure 10:
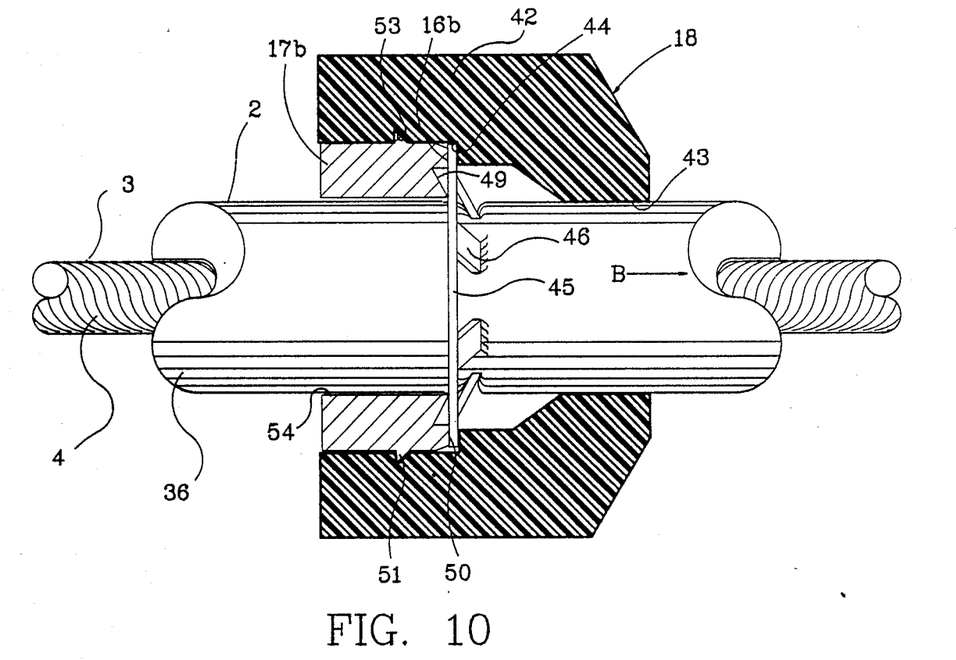
FIG. 10 is a greatly enlarged fragmentary longitudinal sectional view of the movable locking member of FIG. 3, particularly showing the retaining insert and tang ring mounted therein.

Movable locking member 18 includes a generally cylindrical-shaped body 42 preferably formed of a high-strength plastic (FIGS. 2, 3 and 10). Body 42 is formed with a generally cylindrical-shaped passageway 43 adapted for slideably receiving first end 36 of casing 2. Passageway 43 has a generally stepped configuration at an outer end thereof to form a shoulder 44 for positioning a tang ring 16b and a retaining insert 17b therein. Locking member 18 is slideably mounted on casing end 36 adjacent to and spaced from module mounting member 15 (FIG. 2).

Figure 6:
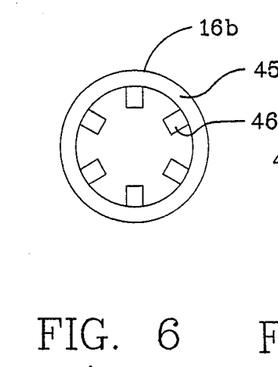
FIG. 6 is an end view of the tang ring component of the improved adjustment assembly.
Figure 7:
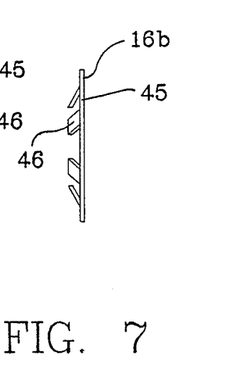
FIG. 7 is a side view of the tang ring of FIG. 6.

Tang rings 16a and 16b are similar to each other and therefore only tang ring 16b is described in detail and shown in the drawings (FIGS. 6 and 7). Tang ring 16b is an integral one-piece metal member formed by a generally flat ring 45 and having a plurality of circumferentially spaced, generally radially inwardly extending tangs 46. Tangs 46 are inclined in a somewhat axial direction as shown in FIG. 7.

Figure 4:
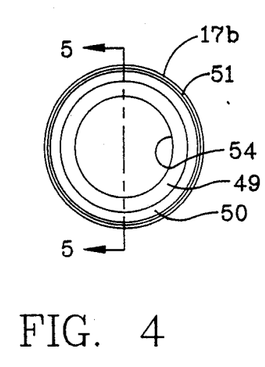
FIG. 4 is an end view of the retaining insert component of the adjustment assembly of the present invention.
Figure 5:
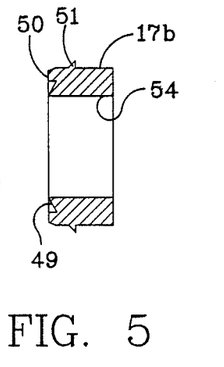
FIG. 5 is a sectional view taken on line 5—5, FIG. 4.

Retaining inserts 17a and 17b are similar to each other and therefore only retaining insert 17b is described in detail and shown in the drawings (FIGS. 4 and 5). Retaining insert 17b is a generally annular-shaped member which defines a passageway 54 and preferably is formed of metal, such as brass or aluminum, or if desired can be formed of a high-strength plastic material. One end of retaining insert 17b has a generally stepped configuration which forms an inclined inner shoulder 49 and an outer flat shoulder 50. An outwardly extending annular ridge 51 is formed on an outer cylindrical surface of insert 17b. Inserts 17a and 17b mount and retain tang rings 16a and 16b in module mounting member 15 and movable locking member 18, respectively, as shown in FIGS. 3 and 10.

More particularly, ridge 51 of annular inserts 17a and 17b is snappingly engaged in complementary-shaped and sized grooves 52 and 53 formed in passageways 35 and 43 of module mounting member 15 and movable locking member 18, respectively, for snap-fitting the inserts in the passageways of the members to hold tang rings 16a and 16b therein. More specifically, tang ring 16a is mounted in passageway 35 of module mounting member 15 so that ring 45 presses against shoulder 37 (FIG. 3). Axially extending tangs 46 extend partially into passageway 35. Retaining insert 17a is snap-fitted in passageway 35 by engagement of ridge 51 of the insert with groove 52 formed in the cylindrical wall of the passageway. Outer shoulder 50 of insert 17a abuts ring 45 and forces it against shoulder 37 of passageway 35 to securely mount tang ring 16a within module mounting member 15. Similarly, tang ring 16b is mounted in passageway 43 of movable locking member 18 so that ring 45 presses against shoulder 44 (FIG. 10). Axially extending tangs 46 extend partially into passageway 43. Retaining insert 17b is snap-fitted in passageway 43 by engagement of ridge 51 of the insert with groove 53 formed in the cylindrical wall of the passageway. Outer shoulder 50 of insert 17b abuts ring 45 and forces it against shoulder 44 of passageway 43 to securely mount tang ring 16b within movable locking member 18.

Figure 8:
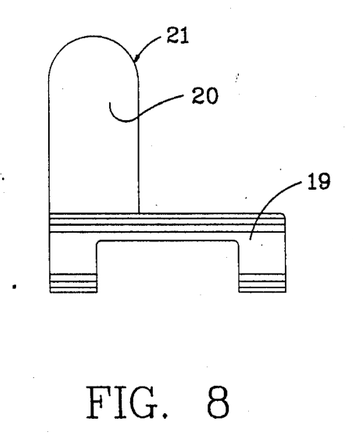
FIG. 8 is a side view of the split sleeve spacer component of the assembly of the invention.
Figure 9:
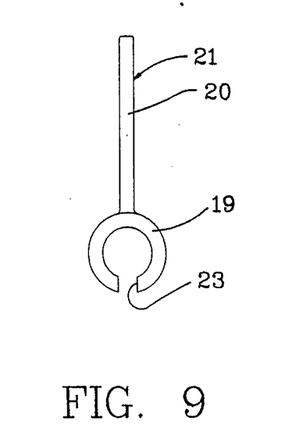
FIG. 9 is an end view of the spacer of FIG. 8.

Split sleeve spacer 21 (FIGS. 2, 8 and 9) preferably is formed of a resilient high-strength plastic, and includes a generally cylindrical-shaped body member 19 formed with a longitudinally extending split 23. A tab 20 is formed integrally with body member 19.

Bulkhead mounting member 22 includes a generally cylindrical-shaped body 25 having a rectangular tab 26 formed integrally therewith (FIGS. 1 and 2), and preferably is formed of a high-strength plastic. Mounting member 22 is molded about a second end 27 of cable casing 2, and is attached to bulkhead 9 adjacent to door 8 by a usual fastener 28, which passes through an opening 29 formed in tab 26 and into the bulkhead to immovably mount casing end 27 thereon.

Module mounting member 15 and movable locking member 18 are mounted on first end 36 of casing 2 in spaced relationship to each other by split sleeve spacer 21 (FIG. 2). Casing end 36 is slideably mounted in passageways 35 and 43 of members 15 and 18 and passageway 54 of retaining inserts 17a and 17b, respectively, and aligns with tang rings 16a and 16b. Mounting member 15 is mounted closer to the termination of casing end 36, so that tangs 46 of tang ring 16a mounted therein are inclined in the direction of arrow "A" in FIG. 3, or what will be toward the temperature control module 7 of the vehicle in which assembly 1 eventually is mounted. Movable locking member 18 is mounted inwardly from mounting member 15 on casing end 36, so that tangs 46 of tang ring 16b mounted therein are inclined in the direction of arrow "B" in FIG. 3. Bulkhead mounting member 22 is immovably molded about second casing end 27. Split sleeve spacer 21 is removably inserted on first casing end 36 between and in abutment with module mounting member 15 and movable locking member 18. Spacer 21 prevents movement of locking member 18 and first casing end 36 in the direction of arrow "A" as shown in FIG. 2 during shipment of assembly 1. Such movement of casing end 36 could be caused by vibrations from transport, etc., and could interfere with the proper adjustment of casing 2 after installation in a vehicle as described in detail below.

Tangs 46 of tang ring 16a permit passage of first casing end 36 through ring 45 thereof in a first direction indicated by arrow "A" in FIG. 3, which is the axially extending direction of the tangs. When casing end 36 passes through ring 45, tangs 46 encircle and grip the casing to restrict movement of the casing back through the ring in a direction opposite to the direction of arrow "A" FIG. 3, or in the direction of arrow "B".

In accordance with the main feature of the invention, tang ring 16b is positioned so that the axially extending direction of its tangs 46 is opposite to the axially extending direction of the tangs of tang ring 16a, or in the direction of arrow "B" of FIG. 3. After the adjustment of casing end 36 in the direction of arrow "A", tangs 46 of tang ring 16b encircle and grip the casing to restrict any additional movement of the casing in the direction of arrow "A", as will be described in greater detail below in the discussion of the operation of assembly 1.

Tang rings 16a and 16b preferably are formed of copper or other suitable material, so that tangs 46 of tang ring 16a are resilient enough to allow passage of casing end 36 through ring 45 in the direction of arrow "A" (FIG. 3) when a sufficiently large force is applied to the casing, yet rigid enough to resist a significantly greater force in the opposite direction to restrict movement of the casing back through the ring in the direction of arrow "B". In addition, tangs 46 of tang ring 16b are rigid enough to resist forces applied to the casing in the direction of arrow "A" after the adjustment of the casing, to prevent additional post-adjustment movement of the casing in that direction. More particularly, tangs 46 preferably are designed to withstand a force, in a direction opposite to their axially extending direction, of approximately fifteen times the force required to pass casing end 36 through tang ring 16a in the adjustment direction of arrow "A" in FIG. 3.

The improved assembly of the present invention is installed and operates in the following manner. Assembly 1 preferably is installed in a car, truck, etc. at the vehicle assembly plant. Assembly 1 reaches the assembly plant in the assembled form shown in FIG. 2. At the vehicle assembly plant, a worker attaches cable end 4 to control lever 6 and cable end 5 is attached to door 8. The worker then fastens bulkhead mounting member 22 to bulkhead 9 adjacent to door 8 by fastener 28. Module mounting member 15 similarly is fastened to control module 7, or adjacent thereto, by fastener 38. Module mounting member 15 freely rotates 360° about casing 2 to accommodate attachment of member 15 to control module 7, as does the module mounting member of the assembly of Pat. No. 4,892,003. More particularly, twisting and binding of casing 2 and cable 3 is not necessary to properly abut tab 34 of member 15 with the surface of control module 7 to which the tab will be attached. Rather, such abutment is accomplished merely by rotating member 15 to the proper position. Spacer sleeve 21 then is manually removed by grasping tab 20 and pulling with approximately $21 \propto 5$ pounds of force, so that resilient body 19 of sleeve 21 deforms and longitudinally extending split 23 thereof widens sufficiently to enable body 19 to be released from casing 2. Lever 6 then is manually moved from the "cold" to "hot" position (FIG. 1) and displaces the cable with a sufficiently large force to enable casing end 36 to move through tangs 46 of tang ring 16a in the direction of arrow "A" (FIG. 3). Any excess slack that is present in casing 2, as illustrated by dot-dash lines in FIG. 1, is removed by movement of the slideably mounted casing through tang ring 16a and toward control module 7, as shown in full lines in FIG. 1.

Locking member 18 moves with casing 2 in the direction of arrow "A" (FIGS. 2 and 3) since the force exerted on casing 2 by movement of lever 6 is not sufficiently large to force the casing through tang ring 16b, because tangs 46 thereof are inclined in the direction of arrow "B", or in the direction opposite to the movement of casing 2. Inclined inner shoulder 49 of insert 17b assists in maintaining tangs 46 in their axially extending direction of arrow "B". Casing 2 is retained in the adjusted position and prevented from moving in the direction of arrow "B" by the gripping action of tangs 46 of ring 16a which bite into the casing as shown in FIG. 3. Inclined inner shoulder 49 of insert 17a similarly assists in maintaining tangs 46 of ring 16a in their axially extending direction of arrow "A". Thus, the elimination of excess slack from casing 2 enables cable 3 to sufficiently move within the casing for moving bulkhead door 8 between open and closed positions.

In accordance with the main feature of the invention, after initial adjustment of casing 2 in the direction of arrow "A" by manual movement of lever 6, the assembly line worker then manually moves locking member 18 in the direction of arrow "A" and into abutment with module mounting member 15. Thus, additional movement of casing 2 in the direction of arrow "A" subsequent to adjustment thereof as described above, is restrained by the gripping action of tangs 46 of tang ring 16b which bite into the casing as shown in FIGS. 3 and 10. Thus, movement of bulkhead door 8 past the fully open position caused by the air blowing past the door, or other vibrations, will not cause overadjustment of casing 2 in the direction of arrow "A". Such forces normally would be sufficiently large to force casing end 36 through tang ring 16a of module mounting member 15 in the absence of tang ring 16b of locking member 18, since tangs 46 of tang ring 16a must be sufficiently resilient to allow movement of circuitous casing 2 therethrough during adjustment of the casing.

The present invention is quickly and easily installed on a vehicle by a worker as the vehicle is moving down the assembly line, and once installed enables the worker to quickly, easily and accurately eliminate the proper amount of excess slack from the casing merely by moving the control module lever from the "cold" to the "hot" position with the required amount of force.

The above-described factory adjustment of the cable casing is adequate for proper operation of the control module lever, cable and door. In addition however, manual positioning of locking member 18 is extremely important to prevent possible overadjustment of the casing at a later time caused by vibration of the vehicle or other factors. Also, it is understood that the above-described assembly can be used in other applications where the adjustment of a cable casing is required.

A second embodiment of the invention is similar to first embodiment 1 in construction and operation, except for the manner of mounting tang rings 16a and 16b in module mounting member 15 and movable locking member 18, respectively. Since the changes to module mounting member 15 and locking member 18 for achieving such different mounting of the tang rings therein are similar, only the changed locking member, indicated generally at 60, will be described and shown herein (FIGS. 11 and 12).

Figure 11:
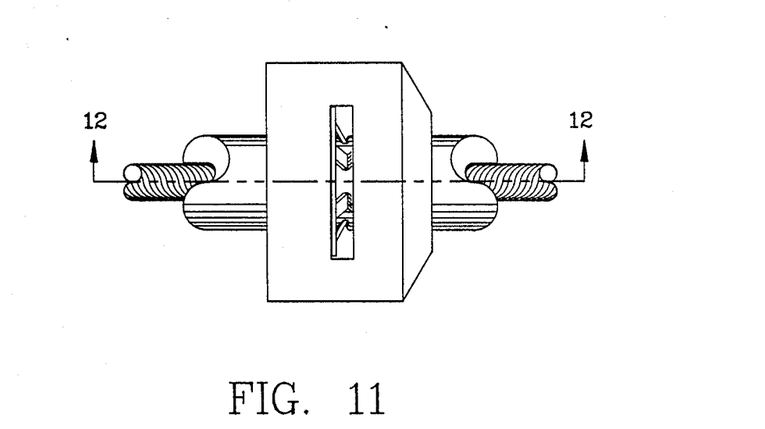
FIG. 11 is a top plan view of the movable locking member of a second embodiment of the present invention, particularly showing the slot formed therein for insertion of the tang ring into the locking member.
Figure 12:
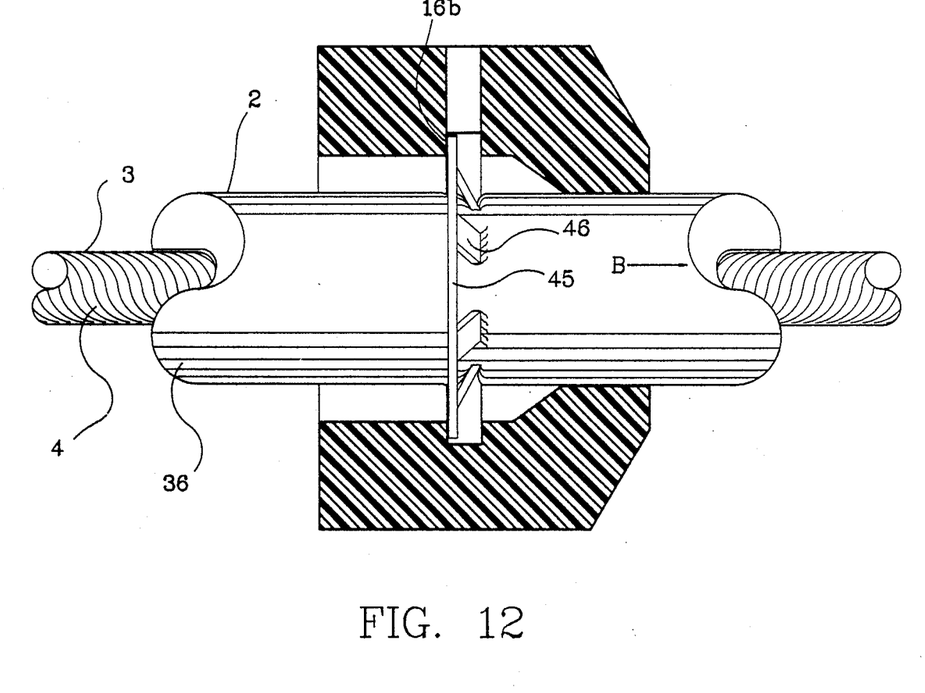
FIG. 12 is a greatly enlarged sectional view taken on line 12—12, FIG. 11.

Locking member 60 of the second embodiment of the invention includes a generally cylindrical-shaped body 61 preferably formed of a high-strength plastic (FIG. 11). Body 61 is formed with a generally cylindrical-shaped axially extending passageway 62 adapted for slideably receiving first end 36 of casing 2 (FIG. 12). Body 61 is formed with a slot 63 having a length and width providing sufficient clearance for insertion of tang ring 16b therethrough and into passageway 62. A groove 64 is formed in an interior surface of body 61 in passageway 62 in opposed spaced relationship to slot 63, and receives ring 45 of tang ring 16b for aligning the tang ring with passageway 62. After passage of casing 2 through tang ring 16b, the tang ring is prevented from falling out of or otherwise being removed from locking member 60 through slot 63. Substantial axial movement of tang ring 16b within locking member 60 is prevented by sidewalls 65 of slot 63 and sidewalls 66 of groove 64. Thus, it can be seen that tang ring 16b is securely mounted within locking member 60 without the need for additional components for retaining the ring in place, which merely add to the cost and complexity of the assembly.

In summary, the improved assembly and method for the adjustment of a cable casing provides for removing excess slack in the casing which prevents proper opening and closing of the bulkhead door and corresponding loss of ability to properly regulate the temperature within the passenger compartment of a vehicle. Most importantly, the tang ring contained in the movable locking member prevents overadjustment of the casing. In addition, the assembly is quickly and easily installed and adjusted at the factory, is relatively inexpensive to manufacture and install, and requires little or no maintenance or repair.

Again, one of the most important features of the present invention is the manner in which the casing is retained in the adjusted position. More particularly, once the casing is moved in the adjustment direction to its adjusted position, the tang ring of the module mounting member is positioned to prevent movement of the casing back through the ring in a direction opposite to the adjustment direction. In accordance with the modification of the assembly of the present invention over similar prior art assemblies, and particularly Pat. No. 4,892,003 the tang ring of the locking member restrains additional movement of the casing in the adjustment direction to prevent overadjustment thereof.

Accordingly, the improved assembly and method for the adjustment of a cable casing is simplified, provides an effective, safe, inexpensive, and efficient assembly and method which achieves all the enumerated objectives, provides for eliminating difficulties encountered with prior assemblies and methods, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the construction of the improved cable casing adjustment assembly and its method of use, the characteristics of the construction, and the advantageous, new and useful results obtained; the new and useful structures, devices, elements, arrangements, parts, combinations, and method steps are set forth in the appended claims.

I claim:

1. An improved assembly for the adjustment of a casing of the type having a cable slideably mounted therein, wherein said cable extends between and operatively connects a pair of movable members, said assembly including, first and second mounting means for attaching the casing at spaced locations generally adjacent to the movable members, said first mounting means movably mounting a first end of the casing, and said second mounting means immovably mounting a second end of the casing; gripping means including a plurality of tangs spaced circumferentially about and gripping the casing mounted in the first mounting means for permitting movement of the movable first end of the casing in a first direction and for restraining movement of said casing in a second direction opposite to said first direction, so that upon movement of one of the movable members in a predetermined direction the movable first end of the casing moves in the first direction to remote slack from the casing, and is retained in an adjusted position and restrained from moving in the second direction by the gangs of the gripping means; lock means movably mounted on the casing adjacent to and spaced from the first mounting means for restraining post-adjustment movement of said casing in the first direction, so that upon manual movement of the lock means into abutment with the first mounting means after movement of the casing to the adjusted position, said casing subsequently is restrained from additional movement in the first direction.

2. The assembly defined in claim 1 in which retainer means is mounted in the first mounting means for holding the gripping means in said first mounting means.

3. The assembly defined in claim 2 in which the retainer means is an annular insert having an outwardly extending ridge formed on an outer surface thereof; in which a complementary-shaped and sized groove is formed in the first mounting means; and in which the ridge of the annular insert is snappingly engaged in the groove of the first mounting means for mounting said insert in said mounting means.

4. The assembly defined in claim 2 in which the first mounting means is a generally cylindrical-shaped member formed with a passageway containing the gripping means and the retainer means therein, and for slideably receiving the movable first end of the casing.

5. The assembly defined in claim 1 in which the lock means includes gripping means mounted in a movable member for restraining post-adjustment movement of the casing in the first direction.

6. The assembly defined in claim 5 in which retainer means is mounted in the movable member for holding the gripping means in said movable member.

7. The assembly defined in claim 6 in which the retainer means is an annular insert having an outwardly extending ridge formed on an outer surface thereof; in which a complementary-shaped and sized groove is formed in the movable member; and in which the ridge of the annular insert is snappingly engaged in the groove of the movable member for mounting said insert in said movable member.

8. The assembly defined in claim 6 in which the movable member is generally cylindrical-shaped and defines a passageway adapted for mounting the gripping means and the retainer means therein, and for slideably receiving the movable first end of the casing.

9. The assembly defined in claim 1 in which a split sleeve is removably mounted on the casing between and in abutment with the first mounting means and the lock means for restraining movement of the lock means and casing in the first direction prior to removal of the sleeve and adjustment of said casing; and in which the length of the sleeve is greater than the distance of adjustment of the casing in the first direction.

10. An improved assembly for the adjustment of a casing of the type having a cable slideably mounted therein, wherein said cable extends between and operatively connects a pair of movable members, said assembly including, first and second mounting means for attaching the casing at spaced locations generally adjacent to the movable members, said first mounting means movable mounting a first end of the casing, and said second mounting means immovably mounting a second end of the casing; gripping means mounted in the first mounting means for permitting movement of the movable first end of the casing in a first direction and for restraining movement of said casing in a second direction opposite to said first direction, so that upon movement of one of the movable members in a predetermined direction the movable first end of the casing moves in the first direction to remove slack from the casing, and is retained in an adjusted position and restrained from moving in the second direction by the gripping means; and lock means movably mounted on the casing adjacent to and spaced from the first mounting means for restraining post-adjustment movement of said casing in the first direction, so that upon manual movement of the lock means into abutment with the first mounting means after movement of the casing to the adjusted position, said casing subsequently is restrained from additional movement in the first direction; said lock means including a plurality of circumferentially spaced, generally radially inwardly extending tangs inclined in the second direction and gripping the casing to restrain additional movement of said casing in the first direction upon manual movement of the movable member into abutment with the first mounting means after movement of the casing to the adjustment position.

* * * * *